Patented Aug. 2, 1932

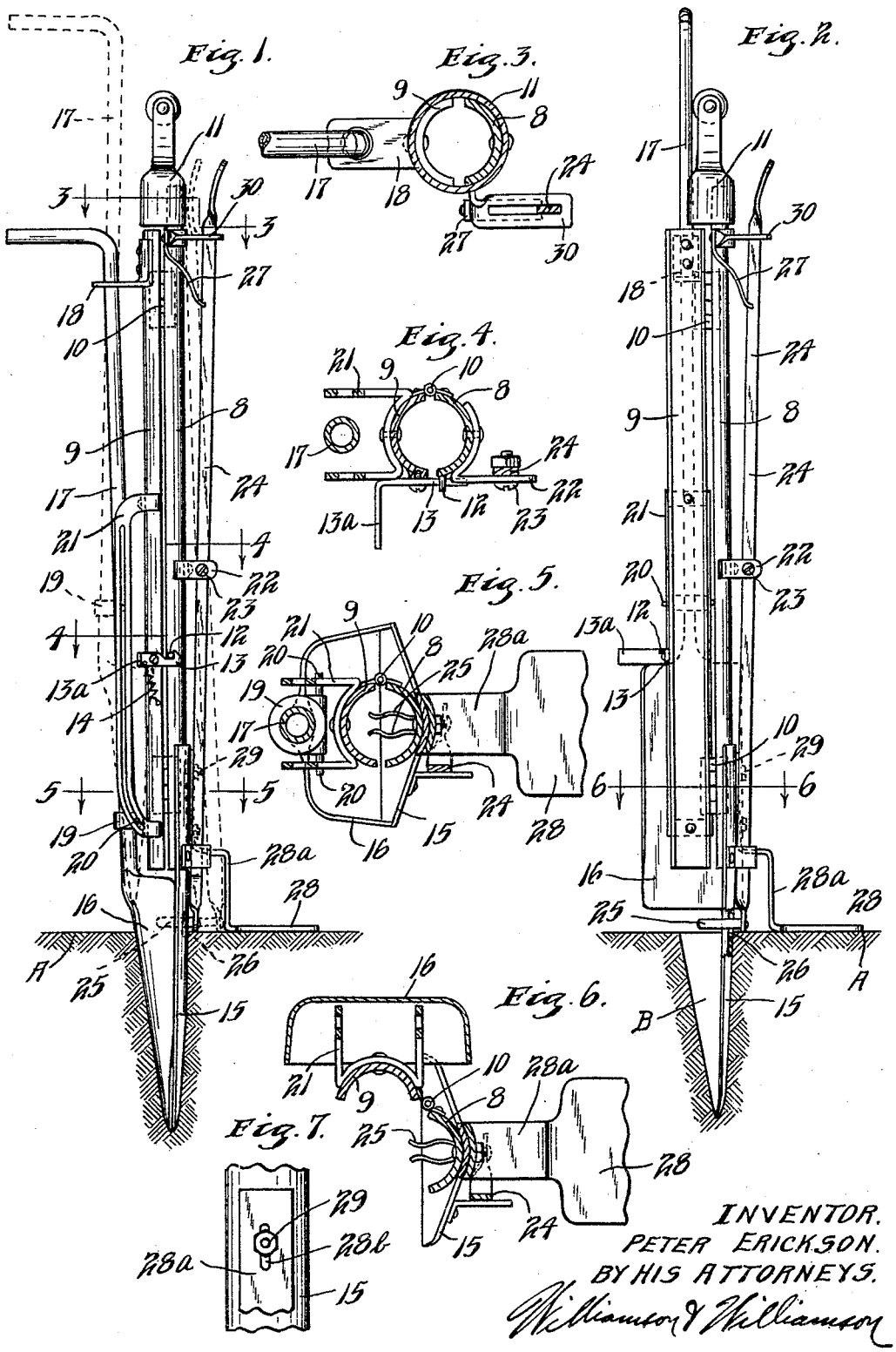

1,870,043

UNITED STATES PATENT OFFICE

PETER ERICKSON, OF EAST GLEN LAKE, MINNESOTA

PLANT PLANTER

Application filed May 21, 1931. Serial No. 538,932.

This invention relates to planters for use in planting plants and shrubs in the ground.

It is the object of this invention to provide a planter of novel and improved construction, which can be used by an operator without stooping over to effectively plant plants such as strawberry plants, raspberry bushes and similar plants, shrubs and bushes in the ground.

To this end, generally stated, the invention consists in the novel parts and novel combinations of parts, hereinafter defined in the claims, and described in the following specification, made in connection with the accompanying drawing, wherein like reference characters refer to the same or similar parts throughout the various views and, in which, Fig. 1 is a view in side elevation illustrating a planter embodying the invention with the parts in the position they will assume when first inserted in the ground in full lines, and with the movable parts in the position they will assume during one operation of the planter in dotted lines;

Fig. 2 is also a view in side elevation of the planter with the movable parts shown in another position;

Figs. 3, 4 and 5 are horizontal sections taken substantially on the lines 3—3, 4—4 and 5—5 respectively of Fig. 1, as indicated by the arrows;

Fig. 6 is a horizontal section taken on the line 6—6 of Fig. 2, as is indicated by the arrows; and Fig. 7 is a view illustrating the manner of attachment of the foot pedal.

Referring to the drawing, and in accordance with the present invention, there is provided a long tubular shank formed by a pair of longitudinally split tubular members 8 and 9 respectively, hingedly connected together by hinges 10. The tubular member 8 preferably projects slightly above the upper end of the tubular member 9 and a handle 11 is secured to the projecting upper end of the member 8. An outwardly projecting pin 12 is carried by the member 8 in upwardly spaced relation from its lower end and a hook 13 pivotally mounted on the member 9 is adapted to engage the pin 12 to retain the two members 8 and 9 in such position that their free edges are adjacent but slightly spaced from each other. The hook 13 is normally held in engagement with the pin 12 by a coiled tension spring 14 secured at one end to the hook and at its other end to the member 9. The hook 13 has an arm 13a extending at right angles to the main portion of the hook for a purpose presently to appear.

Secured to the lower end of the member 8 is a plate 15 forming a shovel slightly arcuately curved in horizontal cross section as best shown in Figs. 5 and 6, and also having its lower end slightly arcuately curved in vertical section, as shown in Figs. 1 and 2. For cooperation with this shovel 15, there is provided a plate 16 forming a second shovel, the side and lower edges of which are at times adapted to be brought into abutment with the side and lower edges of the shovel 15. The shovel 16 is also of arcuate curvature in horizontal cross section, as best shown in Figs. 5 and 6, and it is somewhat arcuately curved at its lower end in vertical section as shown in Fig. 1. The two shovels 15 and 16 have their concave sides oppositely disposed and when the side and bottom edges of these two shovels are in abutment, they form an open topped chamber very similar in shape to that of a duck's bill. The shovel 16 has a rod 17 secured to the outer side of its upper end and this rod runs upwardly through a bracket 18 of angular shape secured to the upper end of the member 9. The rod 17 is angularly bent outwardly above the bracket 18 to form a convenient hand grip portion. A collar 19 is secured to the rod 17 adjacent its lower end and this collar carries a pair of oppositely disposed pins 20 which work within slots in a pair of guides 21 interconnected at their inner ends and secured to the member 9. The slots in these guides run parallel to the edges thereof and the guides are secured at their lower ends to the member 9 adjacent the lower end of the same and then curve outwardly from the member 9 for a short distance, whereupon they are disposed in parallel relation to the member 9. Adjacent their upper ends the guides 21 are again curved inwardly toward the member 9 and are secured again thereto at a point approximately midway between the upper and lower ends of the member. With this construction it will be seen that the shovel 16 can be raised from the full line position illustrated in Fig. 1, to the dotted line position Fig. 1, and as the shovel is raised, the arcuate curvature of the slots adjacent the lower ends of the guides 21 will move the shovel 16 outwardly from the shovel 15.

Secured to the member 8 approximately midway between its ends, is a small bracket 22 carrying a pivot bolt 23 and on this pivot bolt there is mounted a lever 24 which projects upwardly from the pivot bolt 23 through a slotted keeper 25 secured adjacent the upper end of the member 8. The lever 24 also projects downwardly from the pivot 23 to a point slightly below the lower end of the member 8 and the lever is twisted at its lower end through 90° and angularly bent and has secured thereto a pair of oppositely disposed plant holding spring arms 25 forming a spring clip. The two spring arms are joined together to form a clip of substantially U-shape which is secured to the lower end of the lever 24 to normally extend through a small opening 26 in the shovel 15. The two arms 25 have their free ends bent slightly outwardly from each other and the arms are then curved slightly inwardly toward each other and then bulged slightly outwardly from each other and they are then brought into substantially parallel relation adjacent the point of connection with the lever 24. A bar spring 27 is secured to the keeper 30 and has a forked lower end which straddles the inner edge of the lever 24. This spring exerts resilient tension against the upper portion of the lever to maintain the spring clip formed by the arms 25 disposed inwardly from the shovel 15 projected through the opening 26. A foot pedal 28 is secured to the upper end of the shovel 15 and for this purpose the pedal 28 is provided with a strap 28a having a vertical portion in abutment with the upper end of the shovel 15, an outwardly bent horizontal portion and a downwardly bent vertical portion joining the pedal proper and the horizontal portion of the strap. The pedal proper is located approximately level with the spring arms 25 but it may be adjusted upwardly or downwardly relative to the shovel 15 by reason of the fact that the strap 28a has slots 28b cut therein through which nutted bolts 29 extend for securing the strap to the upper portion of the shovel 15. The strap 28a acts as a stop to limit the extreme outward movement of the lower end of the lever 24.

In using the planter, for planting small plants such as strawberry plants, the rod 17 together with the shovel 16 will be raised from a position as shown in full lines, Fig. 1, to a position as shown in dotted lines Fig. 1. The strawberry plant may then be secured between the spring arms 25 of the spring clip by inserting the head of the plant between these spring arms with the roots of the plant projecting downwardly from the spring arms. The rod 17 will then be lowered to the full line position shown in Fig. 1 whereupon the bottom and side edges of the shovel 16 will be brought into engagement with the bottom and side edges of the shovel 15. The operator may then grasp the handle 11 with one hand in the same manner that a spading fork is grasped while at the same time he will hold the rod 17 downwardly by grasping the handle of the rod firmly with his other hand. He may then place his foot on the pedal 28 and press downwardly on this pedal to carry the two shovels 15 and 16 simultaneously into the ground A as shown in Fig. 1. The foot pedal 28 will act as a stop to limit the downward extension of the two shovels 15 and 16 into the ground at such a point that the spring arms 25 and therefore the head of the plant is at the ground level. Retaining one foot on the pedal 28, the operator may then raise the rod 17 to the dotted line position shown in Fig. 1, thereby withdrawing the shovel 16 from the ground A. As the slots in the guides 21 cause the shovel 16 to be carried outwardly from the shovel 15 as the rod 17 is raised, the bottom edge of the shovel 16 will clear the ends of the spring arms 25 and will not strike the plant carried thereby. A pocket such as the pocket B shown in Fig. 2, will be formed in the ground A, as the shovel 16 is removed from the ground and the roots from the plant will be disposed within this pocket. The operator with the foot not pressing the lever 28 may press the soil against the roots of the plant and toward the shovel 15, whereupon the upper end of the lever 24 may be swung inwardly against the tension of the spring 27. The spring clip formed by the spring arms 25, as the lever 24 is moved will be drawn outwardly from the shovel 15 through the opening 26 to release the plant. The handle 11 may then be raised to withdraw the shovel 15 from the ground, whereupon the plant will be properly embedded within the ground. In planting larger plants, shrubs, or bushes, such as raspberry bushes with the planter, the planter is used somewhat differently. Preliminary to affixing the raspberry bush to the planter, the rod 17 will be raised to the dotted line position illustrated in Fig. 1, whereupon the upper edge of the shovel 16 will engage the arm 13a of the hook 13. As the rod is raised slightly beyond this point, the hook 13 will be swung on its pivot to release the hook from the pin 12 whereupon the member 9 may be swung on the hinges 10 to the position illustrated in Fig. 2. The raspberry plant which usually has quite a long stock will then be inserted in place between the spring arms 25, with the long stock extending upwardly within the channel of the member 8. The member 9 may then be swung on the hinges 10 toward the member 8 to cause the hook 13 to engage with the pin 12. The rod 17 will then be lowered whereupon the two shovels may be forced into the ground as before. As the shovel 16 is raised upwardly out of the ground by lifting the rod 17, the shovel will again be brought into engagement with the arm 13a of the hook 13 and carried slightly upwardly to release the hook 13 from the pin 12 whereupon the member 9 may be again swung on its hinges 10 to the position shown in Figs. 2 and 6. The lever 24 may then be operated to release the spring arms from the raspberry plant, whereupon the shovel 15 may be withdrawn from the ground.

It will be seen that the planter operates most effectively to plant various types of plants, shrubs and bushes in the ground. The operator does not need to stoop to insert the plant in the ground and by using the present device, a large number of plants may be very quickly set in the ground. The operation of the device is quite simple. It has been successfully demonstrated in actual practice. It will be understood that if desired, the two members 8 and 9 may be formed integral if the device is to be used for planting plants having short heads or stocks. Where the device is to be used for planting long stock plants, bushes, or shrubs, it is preferred to hinge the two members 8 and 9 together as illustrated in order that the long stocks of the plants may be held between the two members 8 and 9, while the device is being used.

It will, of course, be understood that various changes may be made in the form, details, arrangement and proportions of the various parts without departing from the scope of the persent invention.

What is claimed is:—

1. A plant planter comprising a shank, a first shovel secured to the lower end of said shank, a plant holding clip normally projecting inwardly through an opening adjacent the top of said shovel, means for swinging said clip outwardly through said opening, a second shovel having side and bottom edges adapted at times to be engaged with said first shovel, at least one of said shovels being spoon-shaped so that said shovels form a chamber when they are in engagement and means for raising said second shovel relative to said first shovel.

2. A plant planter comprising a shank, a first shovel secured to the lower end of said shank, a plant holding clip normally projecting inwardly through an opening adjacent the top of said first shovel, means for withdrawing said clip outwardly through said opening, a second shovel having side and bottom edges adapted at times to engage the inner side of said first shovel, at least one of said shovels being spoon-shaped and having its concave side facing the other shovel when said shovels are in engagement to form a chamber, an operating rod secured to said second shovel and guide means carried by said shank for guiding said rod to permit said rod and said second shovel to be raised and lowered relative to said first shovel.

3. The structure defined in claim 2, said guide means being curved outwardly and upwardly away from said first shovel adjacent its lower end to cause said second shovel to be outwardly moved from said first shovel to clear said clip as said rod is raised upwardly.

4. A plant planter comprising a shank, a first shovel secured to the lower end of said shank, a lever pivoted to one side of said shank, a plant holding clip secured to the lower end of said lever and normally projecting through an opening adjacent the top of said first shovel and withdrawable outwardly through said opening by movement of said lever, a second shovel having side and bottom edges adapted at times to be engaged with one side of said first mentioned shovel, at least one of said shovels being spoon-shaped and having its concave side disposed oppositely to the other shovel when the shovels are in engagement to form a chamber, a rod to which the second mentioned shovel is secured, said rod projecting upwardly adjacent said shank and guide means carried by said shank for guiding said rod to permit upward and downward movement of said second shovel relative to said first shovel.

5. The structure defined in claim 4, said guide means including a pair of slotted guide members secured to said shank, pins carried by said rod and fitting within the slots of said guide members, said slots being disposed generally parallel to said shank and having their lower ends curved downwardly and inwardly toward the inner side of said first shovel.

6. A plant planter comprising a pair of oppositely disposed long channel members hinged together at two adjacent edges to form a shank, a first shovel secured to the lower end of one of said members, a plant holding clip normally projecting inwardly through an opening adjacent the top of said first shovel, means for withdrawing said clip outwardly through said opening, substantially vertically disposed guide means carried by said other member, a rod mounted in said guide means for upward and downward movement, a second shovel carried at the lower end of said rod and having side and bottom edges adapted to be engaged with the said first shovel when said rod is lowered, at least one of said shovels being spoon-shaped and having its concave side facing the other shovel when said two shovels are engaged to form a chamber communicating with the channels of said hinged members.

7. The structure defined in claim 6, latching means for latching the free edges of said hinged members together and means for releasing said latching means as said second shovel is raised.

8. The structure defined in claim 6, a pin carried adjacent the free edge of one of said hinged members, a cooperating hook adapted to be engaged with said pin and pivoted adjacent the free edge of the other of said hinged members, said hook having an arm disposed in the path of travel of said second shovel during its upward movement so that as said second shovel is raised, it will strike said arm to disengage said hook from said pin and thereby permit a relative swinging movement between said hinged members on their hinges.

In testimony whereof I affix my signature.

PETER ERICKSON.